(12) United States Patent
Mori et al.

(10) Patent No.: US 12,221,131 B2
(45) Date of Patent: Feb. 11, 2025

(54) ACCIDENT PATTERN DETERMINATION APPARATUS AND METHOD

(71) Applicant: DENSO CORPORATION, Kariya (JP)

(72) Inventors: Masataka Mori, Kariya (JP); Kenji Muto, Kariya (JP); Kazuhito Takenaka, Kariya (JP); Daisuke Hirano, Kariya (JP); Suguru Yamazaki, Kariya (JP); Yoshinori Takeuchi, Kariya (JP); Shun Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 982 days.

(21) Appl. No.: 17/194,726

(22) Filed: Mar. 8, 2021

(65) Prior Publication Data

US 2021/0284197 A1 Sep. 16, 2021

(30) Foreign Application Priority Data

Mar. 10, 2020 (JP) .................. 2020-041407

(51) Int. Cl.

| | |
|---|---|
| *G08G 1/16* | (2006.01) |
| *B60W 40/04* | (2006.01) |
| *B60W 40/09* | (2012.01) |
| *B60W 60/00* | (2020.01) |
| *G06N 5/02* | (2023.01) |
| *B60W 40/08* | (2012.01) |

(52) U.S. Cl.
CPC ........ *B60W 60/0015* (2020.02); *B60W 40/04* (2013.01); *B60W 40/09* (2013.01); *G06N 5/02* (2013.01); *G08G 1/16* (2013.01); *B60W 2040/0872* (2013.01)

(58) Field of Classification Search
CPC .. B60W 60/0015; B60W 40/04; B60W 40/09; B60W 2040/0872; G06N 5/02; G06N 5/022; G08G 1/16; G08G 1/0133; G08G 1/0112; G08G 1/0129; G08G 1/052
See application file for complete search history.

(56) References Cited

U.S. PATENT DOCUMENTS

| | | | |
|---|---|---|---|
| 9,587,952 B1 * | 3/2017 | Slusar | .................. G01C 21/362 |
| 10,599,155 B1 * | 3/2020 | Konrardy | ............... G06N 3/045 |
| 10,762,786 B1 * | 9/2020 | Dewey | .............. B60W 30/0956 |

(Continued)

FOREIGN PATENT DOCUMENTS

| | | |
|---|---|---|
| JP | 6045846 B2 | 12/2016 |
| JP | 2017-146933 A | 8/2017 |
| JP | 2018-055296 A | 4/2018 |

*Primary Examiner* — Hien L Duong
(74) *Attorney, Agent, or Firm* — Maschoff Brennan (57) ABSTRACT

In an accident pattern determination apparatus including a storage storing attributes assigned to respective ones of a plurality of predefined traffic situations, an acquirer acquires, for each of vehicle-related accident cases, an accident pattern that is a combination of traffic situations in the accident case, from the plurality of predefined traffic situations. A determiner determines, for each accident pattern acquired by the acquirer, whether the accident pattern is an accident pattern of high accident risk or an accident pattern of low accident risk for specific vehicles, based on the accident patterns acquired for the respective accident cases and the attributes assigned to respective ones of the plurality of predefined traffic situations.

9 Claims, 10 Drawing Sheets

| | AD MALFUNCTION FACTOR | | | OTHER THAN AD MALFUNCTION FACTOR | | | | | |
|---|---|---|---|---|---|---|---|---|---|
| ID | INTERSECTION WITH OBSTRUCTED VIEW | BACKLIT VIEW | STEEP SLOPE | ROADWAY WITH SINGLE LANE PER DIRECTION | NOT STOPPING AT STOP SIGN | OVER-SPEEDING | ... | STORE ENTRANCE/ EXIT | NUMBER OF CASES |
| 21 | 1 | 1 | 0 | 1 | 0 | 1 | 0 | 1 | N₂₁ = 100 |
| 22 | 0 | 1 | 0 | 1 | 0 | 1 | 0 | 1 | 50 |
| 23 | 1 | 1 | 1 | 1 | 1 | 0 | 0 | 0 | 20 |
| : | | | | | | | | | |
| m | 0 | 0 | 0 | 1 | 0 | 1 | 0 | 1 | Nₘ = 10 |
| : | | | | | | | | | |

REFER TO PATTERN INCLUDING COMMON COMBINATION OF TRAFFIC SITUATIONS NOT ASSIGNED AD MALFUNCTION FACTOR BUT INCLUDING NONE OF TRAFFIC SITUATIONS ASSIGNED AD MALFUNCTION FACTOR $\frac{N_{21}}{N_m} = 10 > th$ (56) References Cited

U.S. PATENT DOCUMENTS

| | | | |
|---|---|---|---|
| 10,830,605 B1* | 11/2020 | Chintakindi | G01C 21/3484 |
| 10,933,881 B1* | 3/2021 | Chan | G06V 40/20 |
| 11,157,973 B2* | 10/2021 | Fuchs | G06Q 30/0283 |
| 2002/0196341 A1* | 12/2002 | Kamijo | G08G 1/164 |
| | | | 348/148 |
| 2011/0077028 A1* | 3/2011 | Wilkes, III | G08G 1/052 |
| | | | 455/456.3 |
| 2013/0018677 A1* | 1/2013 | Chevrette | G06Q 40/08 |
| | | | 705/4 |
| 2014/0220513 A1* | 8/2014 | Harkness | G09B 9/02 |
| | | | 434/69 |
| 2015/0006023 A1* | 1/2015 | Fuchs | G06Q 30/0283 |
| | | | 701/32.2 |
| 2016/0061625 A1* | 3/2016 | Wang | G01C 21/3697 |
| | | | 701/454 |
| 2016/0318445 A1* | 11/2016 | Sugimoto | G06F 3/00 |
| 2017/0089710 A1* | 3/2017 | Slusar | G06V 20/58 |
| 2017/0234689 A1* | 8/2017 | Gibson | B60W 60/0015 |
| | | | 701/25 |
| 2017/0292848 A1* | 10/2017 | Nepomuceno | G01C 21/3492 |
| 2018/0288182 A1* | 10/2018 | Tong | H04N 7/188 |
| 2018/0299284 A1* | 10/2018 | Wang | G08G 1/0112 |
| 2019/0147737 A1* | 5/2019 | Madduri | G08G 1/0129 |
| | | | 701/117 |
| 2019/0187720 A1* | 6/2019 | Fowe | G01C 21/3676 |
| 2019/0283745 A1* | 9/2019 | Nagel | B60W 40/06 |
| 2019/0333156 A1* | 10/2019 | Malkes | G07C 5/008 |
| 2019/0384292 A1* | 12/2019 | Aragon | B60W 50/00 |
| 2020/0066158 A1* | 2/2020 | Park | G06N 3/044 |
| 2020/0070821 A1* | 3/2020 | Wang | B60W 50/0097 |
| 2020/0286310 A1* | 9/2020 | Carver | G07C 5/02 |
| 2021/0323444 A1* | 10/2021 | Fields | B60N 2/0228 |
| 2022/0089063 A1* | 3/2022 | Fields | B60R 21/01554 |

* cited by examiner

Φi : TRAFFIC SITUATIONS
(INTERSECTION WITH NO TRAFFIC LIGHTS, OVER-SPEEDING, etc.)

| ID | $\Phi_1$ | $\Phi_2$ | $\Phi_3$ | $\Phi_4$ | $\Phi_5$ | $\Phi_6$ | $\Phi_7$ | $\Phi_8$ | NUMBER OF CASES |
|---|---|---|---|---|---|---|---|---|---|
| 1 | 1 | 0 | 0 | 1 | 0 | 1 | 0 | 1 | 100 |
| 2 | 0 | 1 | 0 | 1 | 0 | 1 | 0 | 1 | 50 |
| 3 | 1 | 1 | 1 | 1 | 1 | 0 | 0 | 0 | 20 |
| : | | | | | | | | | |

FIG.4

| TRAFFIC SITUATIONS | DRIVER FACTOR | AD MALFUNCTION FACTOR |
|---|---|---|
| NOT STOPPING AT STOP SIGN | 1 | 0 |
| OVER-SPEEDING | 1 | 0 |
| BACKLIT VIEW | 0 | 1 |
| OBSTRUCTED VIEW | 0 | 1 |
| STORE ENTRANCE/EXIT | 0 | 0 |
| : | | |

FIG.5

| | DRIVER FACTOR | | | OTHER THAN DRIVER FACTOR | | | | |
|---|---|---|---|---|---|---|---|---|
| ID | NOT STOPPING AT STOP SIGN | OVER-SPEEDING | WRONG-WAY DRIVING | ROADWAY WITH SINGLE LANE PER DIRECTION | INTERSECTION WITH OBSTRUCTED VIEW | BACKLIT VIEW | ... | STORE ENTRANCE/EXIT | NUMBER OF CASES |
| 1 | 1 | 1 | 0 | 1 | 0 | 1 | 0 | 1 | $N_1 = 100$ |
| 2 | 0 | 1 | 0 | 1 | 0 | 1 | 0 | 1 | 50 |
| 3 | 1 | 1 | 1 | 1 | 1 | 0 | 0 | 0 | 20 |
| : | | | | | | | | | |
| j | 0 | 0 | 0 | 1 | 0 | 1 | 0 | 1 | $N_j = 10$ |
| : | | | | | | | | | |

REFER TO PATTERN INCLUDING COMMON COMBINATION OF TRAFFIC SITUATIONS NOT ASSIGNED DRIVER FACTOR BUT INCLUDING NONE OF TRAFFIC SITUATIONS ASSIGNED DRIVER FACTOR $\dfrac{N_1}{N_j} = 10 >$ th

FIG.6

| ID | DRIVER FACTOR | | | OTHER THAN DRIVER FACTOR | | | | NUMBER OF CASES |
|---|---|---|---|---|---|---|---|---|
| | NOT STOPPING AT STOP SIGN | OVER-SPEEDING | WRONG-WAY DRIVING | ROADWAY WITH SINGLE LANE PER DIRECTION | INTERSECTION WITH OBSTRUCTED VIEW | BACKLIT VIEW | ... | STORE ENTRANCE/ EXIT |
| 11 | 1 | 1 | 0 | 1 | 0 | 1 | 0 | 1 | $N_{11}$ = 80 |
| 12 | 0 | 1 | 0 | 1 | 0 | 1 | 0 | 1 | 50 |
| 13 | 1 | 1 | 1 | 1 | 1 | 0 | 0 | 0 | 20 |
| : | | | | | | | | | |
| k | 0 | 0 | 0 | 1 | 0 | 1 | 0 | 1 | $N_k$ = 100 |
| : | | | | | | | | | |

$$\frac{N_{11}}{N_k} = 0.8 < th$$

REFER TO PATTERN INCLUDING COMMON COMBINATION OF TRAFFIC SITUATIONS NOT ASSIGNED DRIVER FACTOR BUT INCLUDING NONE OF TRAFFIC SITUATIONS ASSIGNED DRIVER FACTOR

FIG.7

| | AD MALFUNCTION FACTOR | | | OTHER THAN AD MALFUNCTION FACTOR | | | | | |
|---|---|---|---|---|---|---|---|---|---|
| ID | INTERSECTION WITH OBSTRUCTED VIEW | BACKLIT VIEW | STEEP SLOPE | ROADWAY WITH SINGLE LANE PER DIRECTION | NOT STOPPING AT STOP SIGN | OVER-SPEEDING | ... | STORE ENTRANCE/EXIT | NUMBER OF CASES |
| 21 | 1 | 1 | 0 | 1 | 0 | 1 | 0 | 1 | $N_{21}$ = 100 |
| 22 | 0 | 1 | 0 | 1 | 0 | 1 | 0 | 1 | 50 |
| 23 | 1 | 1 | 1 | 1 | 1 | 0 | 0 | 0 | 20 |
| .. | | | | | | | | | |
| m | 0 | 0 | 0 | 1 | 0 | 1 | 0 | 1 | $N_m$ = 10 |
| .. | | | | | | | | | |

REFER TO PATTERN INCLUDING COMMON COMBINATION OF TRAFFIC SITUATIONS NOT ASSIGNED AD MALFUNCTION FACTOR BUT INCLUDING NONE OF TRAFFIC SITUATIONS ASSIGNED AD MALFUNCTION FACTOR $\dfrac{N_{21}}{N_m}$ = 10 > th

FIG.8

| | AD MALFUNCTION FACTOR | | | OTHER THAN AD MALFUNCTION FACTOR | | | | |
|---|---|---|---|---|---|---|---|---|
| ID | INTERSECTION WITH OBSTRUCTED VIEW | BACKLIT VIEW | STEEP SLOPE | ROADWAY WITH SINGLE LANE PER DIRECTION | NOT STOPPING AT STOP SIGN | OVER-SPEEDING | ... | STORE ENTRANCE/EXIT | NUMBER OF CASES |
| 31 | 1 | 1 | 0 | 1 | 1 | 1 | 0 | 1 | $N_{31} = 80$ |
| 32 | 0 | 1 | 0 | 1 | 0 | 1 | 0 | 1 | 50 |
| 33 | 1 | 1 | 1 | 1 | 1 | 0 | 0 | 0 | 20 |
| : | | | | | | | | | |
| n | 0 | 0 | 0 | 1 | 0 | 1 | 0 | 1 | $N_n = 115$ |
| : | | | | | | | | | |

REFER TO PATTERN INCLUDING COMMON COMBINATION OF TRAFFIC SITUATIONS NOT ASSIGNED AD MALFUNCTION FACTOR BUT INCLUDING NONE OF TRAFFIC SITUATIONS ASSIGNED AD MALFUNCTION FACTOR $$\frac{N_{31}}{N_n} = 0.7 < th$$

| TRAFFIC SITUATIONS | AGE-RELATED FACTOR |
|---|---|
| ERRONEOUS PEDAL DEPRESSION | 1 |
| WRONG-WAY DRIVING | 1 |
| NOT LIGHTING TURN SIGNALS | 1 |
| OVER-SPEEDING | 0 |
| ⋮ | |

FIG.11

| ID | AGE-RELATED FACTOR | | | OTHER THAN AGE-RELATED FACTOR | | | | NUMBER OF CASES |
|---|---|---|---|---|---|---|---|---|
| | ERRONEOUS PEDAL DEPRESSION | NOT LIGHTING TURN SIGNALS | WRONG-WAY DRIVING | OVER-SPEEDING | INTERSECTION WITH OBSTRUCTED VIEW | BACKLIT VIEW | ... | STORE ENTRANCE/EXIT | |
| 1 | 1 | 1 | 0 | 1 | 0 | 1 | 0 | 1 | $N_1 = 100$ |
| 2 | 0 | 1 | 0 | 1 | 0 | 1 | 0 | 1 | 50 |
| 3 | 1 | 1 | 1 | 1 | 1 | 0 | 0 | 0 | 20 |
| .. | | | | | | | | | |
| k | 0 | 0 | 0 | 1 | 0 | 1 | 0 | 1 | $N_k = 10$ |
| .. | | | | | | | | | |

REFER TO PATTERN INCLUDING COMMON COMBINATION OF TRAFFIC SITUATIONS NOT ASSIGNED AGE-RELATED FACTOR BUT INCLUDING NONE OF TRAFFIC SITUATIONS ASSIGNED AGE-RELATED FACTOR $N_1 = 10 > th$ $\dfrac{N_1}{N_k} \gg$

ACCIDENT PATTERN DETERMINATION APPARATUS AND METHOD

CROSS-REFERENCE TO RELATED APPLICATION

This application is based on and claims the benefit of priority from earlier Japanese Patent Application No. 2020-041407 filed on Mar. 10, 2020, the description of which is incorporated herein by reference.

BACKGROUND

Technical Field

The present disclosure relates to an accident pattern determination apparatus and an accident pattern determination method.

Related Art

A known traffic accident prediction apparatus learns accident occurrence patterns from past accident data and predicts occurrence of accidents.

DESCRIPTION OF SPECIFIC EMBODIMENTS

The above known traffic accident prediction apparatus, as disclosed in JP-B-6045846, is configured to learn accident occurrence patterns from accident data during manual driving. Such a traffic accident prediction apparatus is unable to determine, from the learned accident occurrence patterns, whether an accident is likely to occur in autonomous driving. For example, in autonomous driving, accidents caused by human errors, such as oversight and distracted driving, are unlikely to occur.

In view of the above, it is desired to have a technique for determining an accident risk for specific vehicles or specific drivers using a simple process.

One aspect of the present disclosure provides an accident pattern determination apparatus including: a storage storing attributes assigned to respective ones of a plurality of predefined traffic situations; an acquirer configured to acquire, for each of vehicle-related accident cases, an accident pattern that is a combination of traffic situations in the accident case, from the plurality of predefined traffic situations; and a determiner configured to determine, for each accident pattern acquired by the acquirer, whether the accident pattern is an accident pattern of high accident risk or an accident pattern of low accident risk for specific vehicles, based on the accident patterns acquired for the respective accident cases and the attributes assigned to respective ones of the plurality of predefined traffic situations.

Another aspect of the present disclosure provides an accident pattern determination apparatus including: a storage storing attributes assigned to respective ones of a plurality of predefined traffic situations; an acquirer configured to acquire, for each of vehicle-related accident cases, an accident pattern that is a combination of traffic situations in the accident case, from the plurality of predefined traffic situations; and a determiner configured to determine, for each accident pattern acquired by the acquirer, whether the accident pattern is an accident pattern of high accident risk or an accident pattern of low accident risk for specific drivers, based on the accident patterns acquired for the respective accident cases and the attributes assigned to respective ones of the plurality of predefined traffic situations.

The above aspects of the present disclosure enable a simple determination process of determining a traffic accident risk for specific vehicles or specific drivers.

An overview of embodiments of the present disclosure will now be described before describing the embodiments of the present disclosure in detail.

Overview of Embodiments

Conventionally, traffic situation patterns in which a traffic accident is likely to occur to human drivers are extracted from accident data for human drivers. An evaluation as to whether a traffic accident is likely to occur is made by driving an autonomous driving vehicle in simulated traffic situations. Since it is not practical to simulate all the traffic situations that can actually occur, accident patterns for human drivers are targeted.

However, simulations need to be uniformly performed irrespective of the likelihood of traffic accidents in autonomous driving, leading to inefficiency. Accident patterns arising from aside driving or sleepy driving are evidently not of high accident risk in autonomous driving while accident patterns arising from malfunction factors of sensors used in autonomous driving are evidently of high accident risk in autonomous driving.

In the present embodiment, an attribute is assigned to each traffic situation in response to the presence of its relationship to a risk in autonomous driving. Attributes assigned to traffic situations forming an accident pattern are used to determine whether simulations are needed. This enables omission of simulations of traffic situations for which the presence or absence of risk is evident, which can reduce simulation efforts.

The traffic situations include situations regarding driving environment information, situations regarding driver information, situations regarding vehicle information, and situations regarding vehicle behavior information.

System Configuration of Accident Pattern Determination Apparatus

Figure 1:
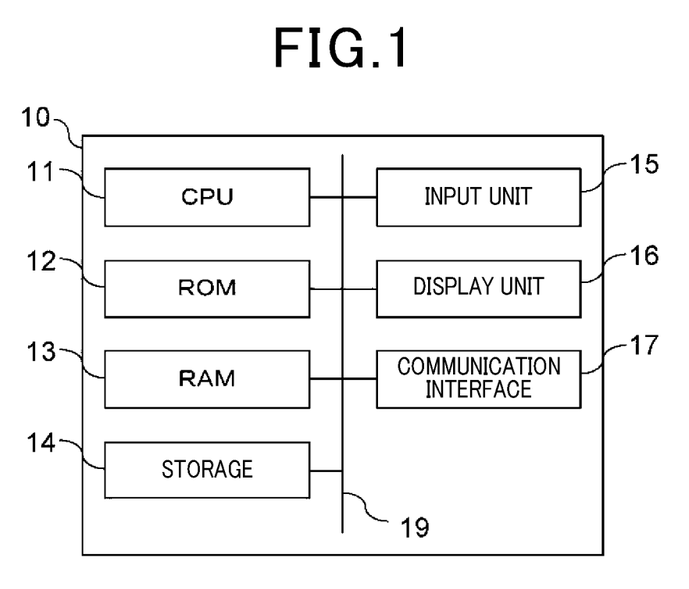
FIG. 1 is a schematic block diagram of a computer that serves as an accident pattern determination apparatus according to one embodiment.

FIG. 1 is a block diagram illustrating a hardware configuration of an accident pattern determination apparatus 10 according to one embodiment of the present disclosure.

As illustrated in FIG. 1, the accident pattern determination apparatus 10 includes a central processing unit (CPU) 11, a read only memory (ROM) 12, a random access memory (RAM) 13, a storage 14, an input unit 15, a display unit 16, and a communication interface (I/F) 17. These components are communicatively connected to each other via a bus 19.

The CPU 11 executes various programs to control various components. That is, the CPU 11 loads the programs from the ROM 12 or the storage 14 and executes the programs using the RAM 13 as a work area. The CPU 11 controls the various components and performs various calculation processes according to the programs stored in the ROM 12 or the storage 14. In the present embodiment, at least one accident pattern determination program for determining an accident risk in autonomous driving is stored in the ROM 12 or the storage 14. The at least one accident pattern determination program may be a single program or a plurality of programs or a set of programs forming a module.

The ROM 12 stores various programs and various data. The RAM 13, as a a work area, temporarily stores programs or data. The storage 14 may be formed of a hard disk drive (HDD) or a solid state drive (SSD) to store various programs including an operating system (OS), and various data.

The input unit 15 includes a pointing device, such as a mouse or the like, and a keyboard, and is used to provide various inputs.

The input unit 15 receives, for each vehicle-related accident case, inputs of video, location information, behavior data, driver information, or traffic situation data.

More specifically, the input unit 15 receives, as video, inputs of forward video acquired by a known dashboard camera around the time of occurrence of the accident. The input unit 15 receives, as location information, inputs of GPS location information acquired by the known dashboard camera around the time of occurrence of the accident. The input unit 15 receives, as behavior data, inputs of vehicle speeds, pedal actuation amounts, steering amounts, or accelerations acquired by the known dashboard camera around the time of occurrence of the accident. The input unit 15 receives, as driver information, inputs of sensor information acquired by a known biometric sensor around the time of occurrence of the accident, or driver's ID, age, gender or driving experience.

In addition, the input unit 15 receives, as traffic situation data, inputs of traffic situation labels assigned in a known manner from the video, the location information, the behavior data, or the driver information. For example, the input unit 15 receives, as traffic situation labels regarding driving environment information, inputs of date and time, locations, road structures (e.g., the number of lanes, lane widths, intersection angles, visibility, or the presence of signal traffic lights), weather, or traffic volumes. The input unit 15 receives, as traffic situation labels regarding driver information, inputs of driver's age, gender, driving history, driving experience at an accident occurrence point, or the like. The input unit 15 receives, as traffic situation labels regarding vehicle information, inputs of a vehicle type (such as a passenger car, a cargo truck or the like), or the presence of driving assistance functions (e.g., automatic braking, lane keeping or the like). The input unit 15 receives, as traffic situation labels regarding vehicle behavior information, inputs of behavior types (e.g., go straight, stopping, turn left, turn right or the like), vehicle speeds, traffic violations (e.g., not stopping at stop sign, over-speeding or the like). Types of the traffic situation labels are predefined.

The display unit 16 may include a liquid crystal display (LCD) to display various information. The display unit 16 may be of touch panel type so as to also serve as the input unit 15.

The communication interface 17 is an interface for communicating with other devices, where communication standards, such as Ethernet (registered trademark), Fiber Distributed Data Interface (FDDI), Wi-Fi (registered trademark), may be employed.

Figure 2:
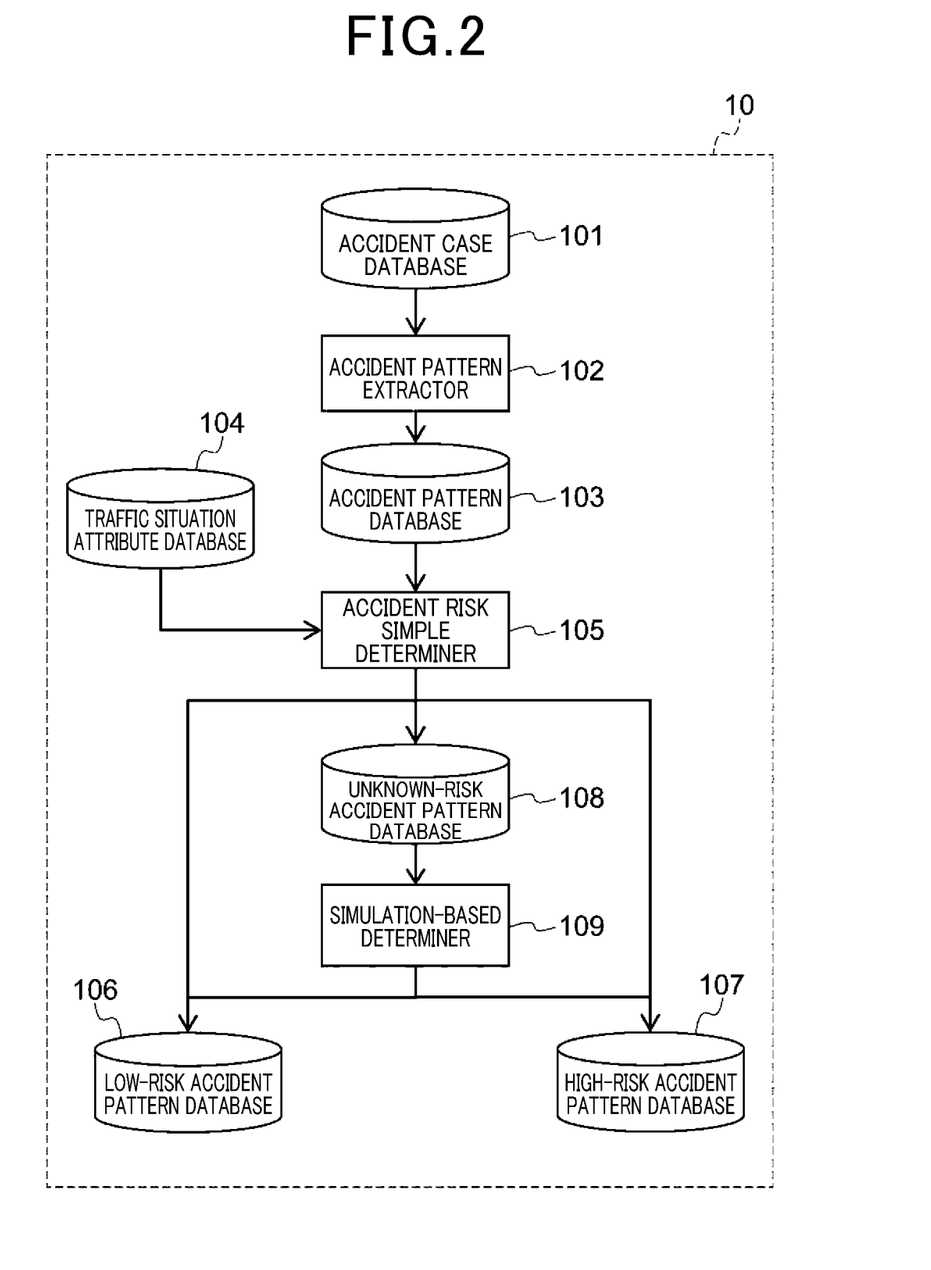
FIG. 2 is a functional block diagram of the accident pattern determination apparatus.

Functions of the accident pattern determination apparatus 10 will now be described. FIG. 2 is a functional block diagram illustrating an example of the functions of the accident pattern determination apparatus 10.

As illustrated in FIG. 2, the accident pattern determination apparatus 10 includes, as functional blocks, an accident case database 101, an accident pattern extractor 102, an accident pattern database 103, a traffic situation attribute database 104, an accident risk simple determiner 105, a low-risk accident pattern database 106, a high-risk accident pattern database 107, an unknown-risk accident pattern database 108, and a simulation-based determiner 109.

The accident case database 101 stores, for each vehicle-related accident case, video, location information, behavior data, driver information, or traffic situation data.

The accident pattern extractor 102 extracts, for each vehicle-related accident case, an accident pattern that is a combination of traffic situations in the accident case, from the video, location information, behavior data, driver information, or traffic situation data for the accident case. Since a known technique may be used to extract such an accident pattern, detailed description will be omitted. The accident pattern extractor 102 corresponds to the acquirer.

For each extracted accident pattern, the accident pattern extractor 102 counts and stores in the accident pattern database 103 the number of accident cases which have the extracted accident pattern.

Figure 3:
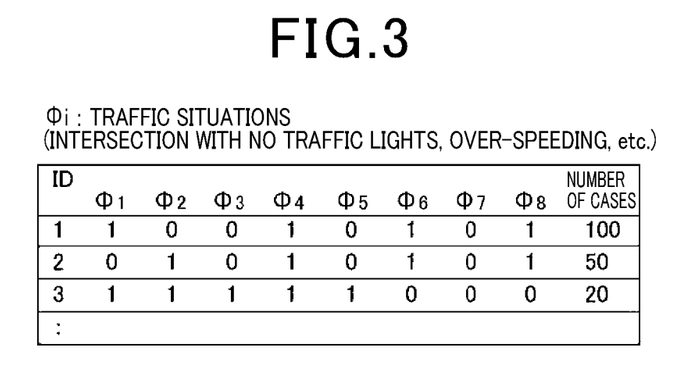
FIG. 3 is an example of an accident pattern database.

As illustrated in FIG. 3, the accident pattern database 103 stores, for each accident pattern, the number of accident cases having the extracted accident pattern. In FIG. 3, for each ID that identifies a respective one of the accident patterns, the presence or absence of each one of traffic situations is indicated by "1" or "0" where "1" means the presence of the traffic situation in the accident pattern and "0" means the absence of the traffic situation in the accident pattern. In addition, the number of accident cases having the accident pattern extracted is also presented.

Figure 4:
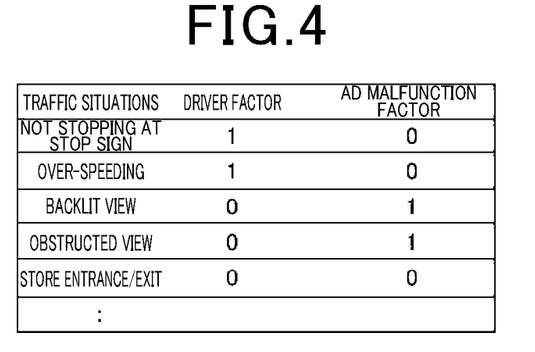
FIG. 4 is an example of a traffic situation attribute database.

As illustrated in FIG. 4, the traffic situation attribute database 104 stores an attribute for each one of the plurality of predefined traffic situations included in the accident pattern database 103. The attributes include an autonomous driving (AD) malfunction factor and a driver factor. In a traffic situation assigned the AD malfunction factor, autonomous driving will evidently malfunction. A traffic situation assigned the driver factor is likely to affect a driving behavior of a driver.

More specifically, the attribute "AD malfunction factor" is assigned to traffic situations in which autonomous driving will evidently malfunction. For example, each traffic situation assigned the attribute "AD malfunction factor" is a traffic situation that meets a specified malfunction condition of a sensor used in autonomous driving. The traffic situations, such as "backlit view", "obstructed view" and the like, in which the sensor is likely to malfunction, are assigned the "AD malfunction factor".

The attribute "driver factor" is assigned to traffic situations that are likely to occur to only human drivers. For example, the traffic situations regarding driver information, such as "aside driving", "sleepy driving" and the like, and the traffic situations regarding traffic violations, such as "not stopping at stop sign", "over-speeding" and the like, are assigned the attribute "driver factor".

A traffic situation that is neither a traffic situation in which autonomous driving will evidently malfunction nor a traffic situation that is likely to occur to only human drivers is not assigned any attribute.

In an example illustrated in FIG. 4, for each traffic situation, whether or not the traffic situation is assigned the attribute "driver factor" is indicated by "1" or "0". In addition, for each traffic situation, whether or not the traffic situation is assigned the attribute "AD malfunction factor" is indicated by "1" or "0". For example, the traffic situation "not stopping at stop sign" is assigned the attribute "driver factor", but not assigned the attribute "AD malfunction factor". The traffic situation "backlit view" is assigned the attribute "AD malfunction factor", but not assigned the attribute "driver factor".

The accident risk simple determiner 105 determines, for each accident pattern, whether the accident pattern is of high accident risk or of low accident risk for autonomous driving vehicles, based on the accident patterns of the respective accident cases stored in the accident pattern database 103 and the attributes assigned to the plurality of traffic situations stored in the traffic situation attribute database 104. The accident risk simple determiner 105 corresponds to the determiner.

More specifically, the accident risk simple determiner 105 acquires, for each accident pattern including at least one traffic situation assigned the attribute "driver factor", the number of accident cases for the accident pattern. In addition, the accident risk simple determiner 105 acquires, for each accident pattern including at least one traffic situation assigned the attribute "driver factor", the number of accident cases for an accident pattern that shares a common combination of traffic situations other than the traffic situations assigned the attribute "driver factor" with the accident pattern including at least one traffic situation assigned the attribute "driver factor", but includes none of the traffic situations assigned the attribute "driver factor". The accident risk simple determiner 105 compares the number of accident cases for the accident pattern including at least one traffic situation assigned the attribute "driver factor" and the number of accident cases for the accident pattern including the common combination of traffic situations other than the traffic situations assigned the attribute "driver factor" but including none of the traffic situations assigned the attribute "driver factor", thereby determining whether the accident pattern including at least one traffic situation assigned the attribute "driver factor" is of low accident risk for the autonomous driving vehicles.

Figure 5:
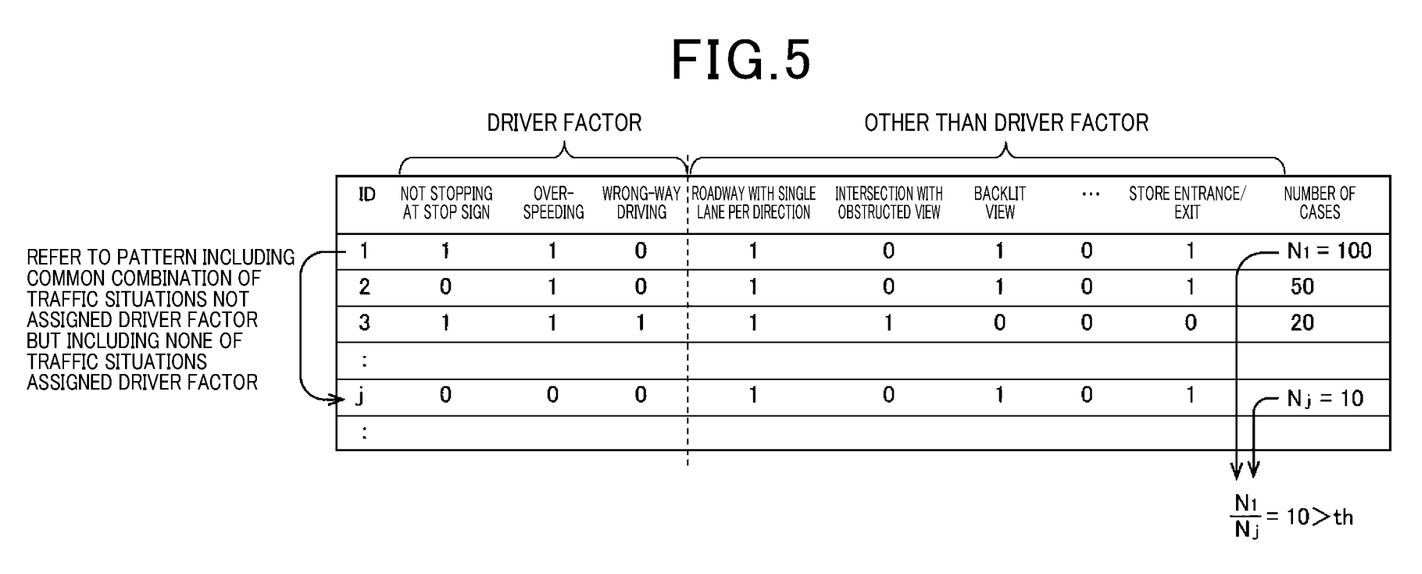
FIG. 5 is an illustration of determining an accident risk based on a driver factor.

For example, as illustrated in FIG. 5, the number of accident cases for the accident pattern of ID "1", N1, is 100. The accident pattern of ID "j" is an accident pattern that shares a common combination of traffic situations other than the traffic situations assigned the attribute "driver factor" with the accident pattern of ID "1", but includes none of the traffic situations assigned the attribute "driver factor". A ratio of N1 to Nj (=N1/Nj) is calculated, where Nj is the number of accident cases for the accident pattern of ID "j". If the ratio of N1 to Nj (where N1/Nj=10) is greater than a threshold th, it is determined that the accident pattern of ID "1" is of low accident risk for the autonomous driving vehicles. This is because it may be construed that an accident not involved in any traffic situations assigned the attribute "driver factor" is unlikely to occur to the autonomous driving vehicles. The threshold th may be set by a user of the accident pattern determination apparatus of the present embodiment.

Figure 6:
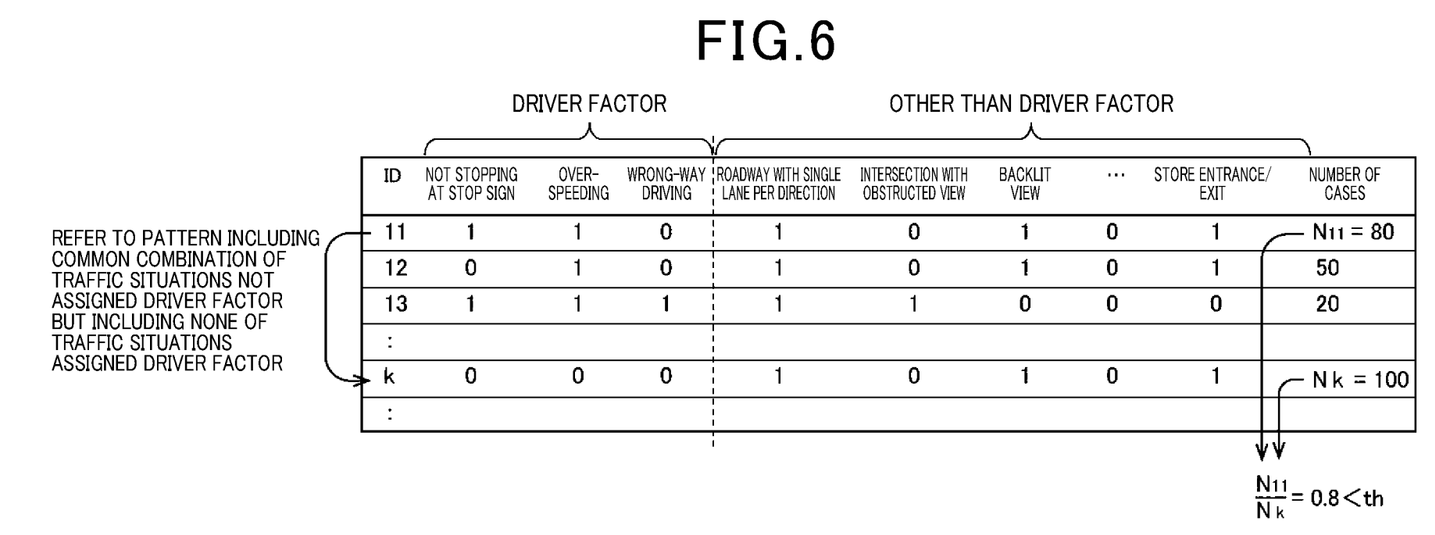
FIG. 6 is an illustration of determining an accident risk based on a driver factor.

In FIG. 6, N11 is 80, where N11 is the number of accident cases for the accident pattern of ID "11". The accident pattern of ID "k" is an accident pattern that shares a common combination of traffic situations other than the traffic situations assigned the attribute "driver factor" with the accident pattern of ID "11", but includes none of the traffic situations assigned the attribute "driver factor". A ratio of N11 to Nk, that is, N11/Nk, is calculated, where Nk is the number of accident cases for the accident pattern of ID "k". If the ratio of N11 to Nk (where N11/Nk=0.8) is equal to or less than the threshold th, it is not determined that the accident pattern of ID "11" is of low accident risk for the autonomous driving vehicles.

In addition, the accident risk simple determiner 105 determines that an accident pattern including only traffic situations assigned the attribute "driver factor" is of low accident risk for the autonomous driving vehicles.

Furthermore, the accident risk simple determiner 105 acquires, for each accident pattern including at least one traffic situation assigned the attribute "AD malfunction factor", the number of accident cases for the accident pattern. The accident risk simple determiner 105 acquires, for each accident pattern including at least one traffic situation assigned the attribute "AD malfunction factor", the number of accident cases for an accident pattern that shares a common combination of traffic situations other than the traffic situations assigned the attribute "AD malfunction factor" with the accident pattern including at least one traffic situation assigned the attribute "AD malfunction factor", but includes none of the traffic situations assigned the attribute "AD malfunction factor". The accident risk simple determiner 105 compares the number of accident cases for the accident pattern including at least one traffic situation assigned the attribute "AD malfunction factor" and the number of accident cases for the accident pattern including the common combination of traffic situations other than the traffic situations assigned the attribute "AD malfunction factor" but including none of the traffic situations assigned the attribute "AD malfunction factor", thereby determining whether the accident pattern including at least one traffic situation assigned the attribute "AD malfunction factor" is of high accident risk for the autonomous driving vehicles.

Figure 7:
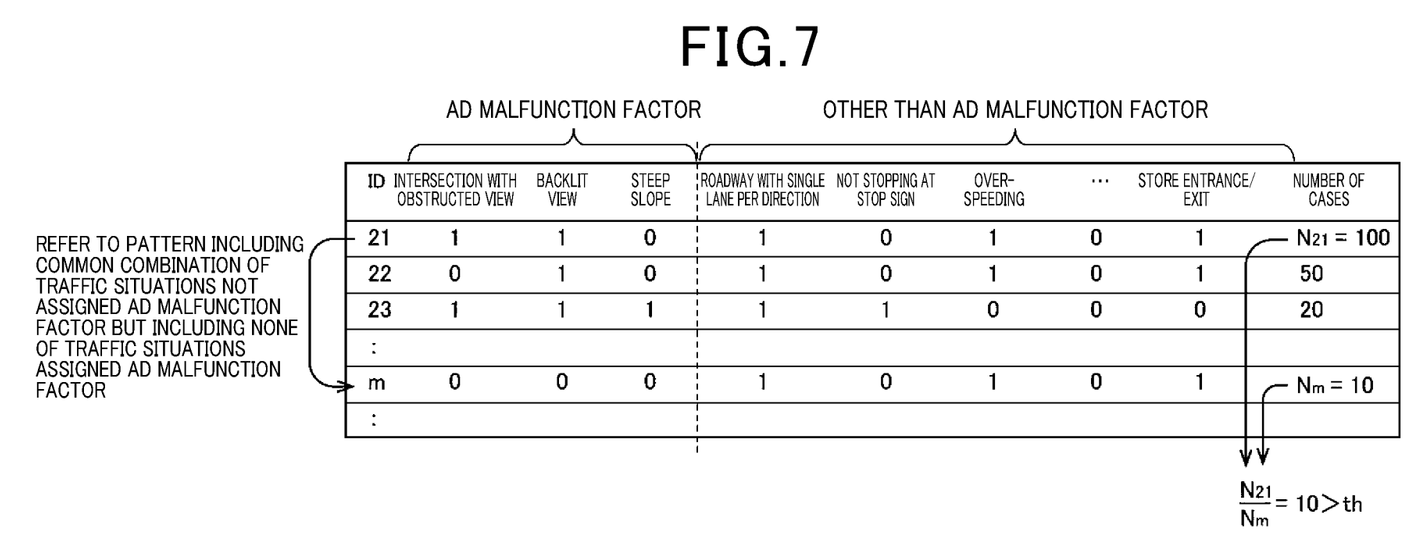
FIG. 7 is an illustration of determining an accident risk based on an AD malfunction factor.

For example, as illustrated in FIG. 7, the number of accident cases for the accident pattern of ID "21", N21, is 100. The accident pattern of ID "m" is an accident pattern that shares a common combination of traffic situations other than the traffic situations assigned the attribute "AD malfunction factor" with the accident pattern of ID "21", but includes none of the traffic situations assigned the attribute "AD malfunction factor". A ratio of N21 to Nm (=N21/Nm) is calculated, where Nm is the number of accident cases for the accident pattern of ID "m". If the ratio of N21 to Nm (where N21/Nm=10) is greater than the threshold th, it is determined that the accident pattern of ID "21" is of high accident risk for the autonomous driving vehicles. This is because it may be construed that an accident involved in at least one traffic situation assigned the attribute "AD malfunction factor" is likely to occur to the autonomous driving vehicles.

Figure 8:
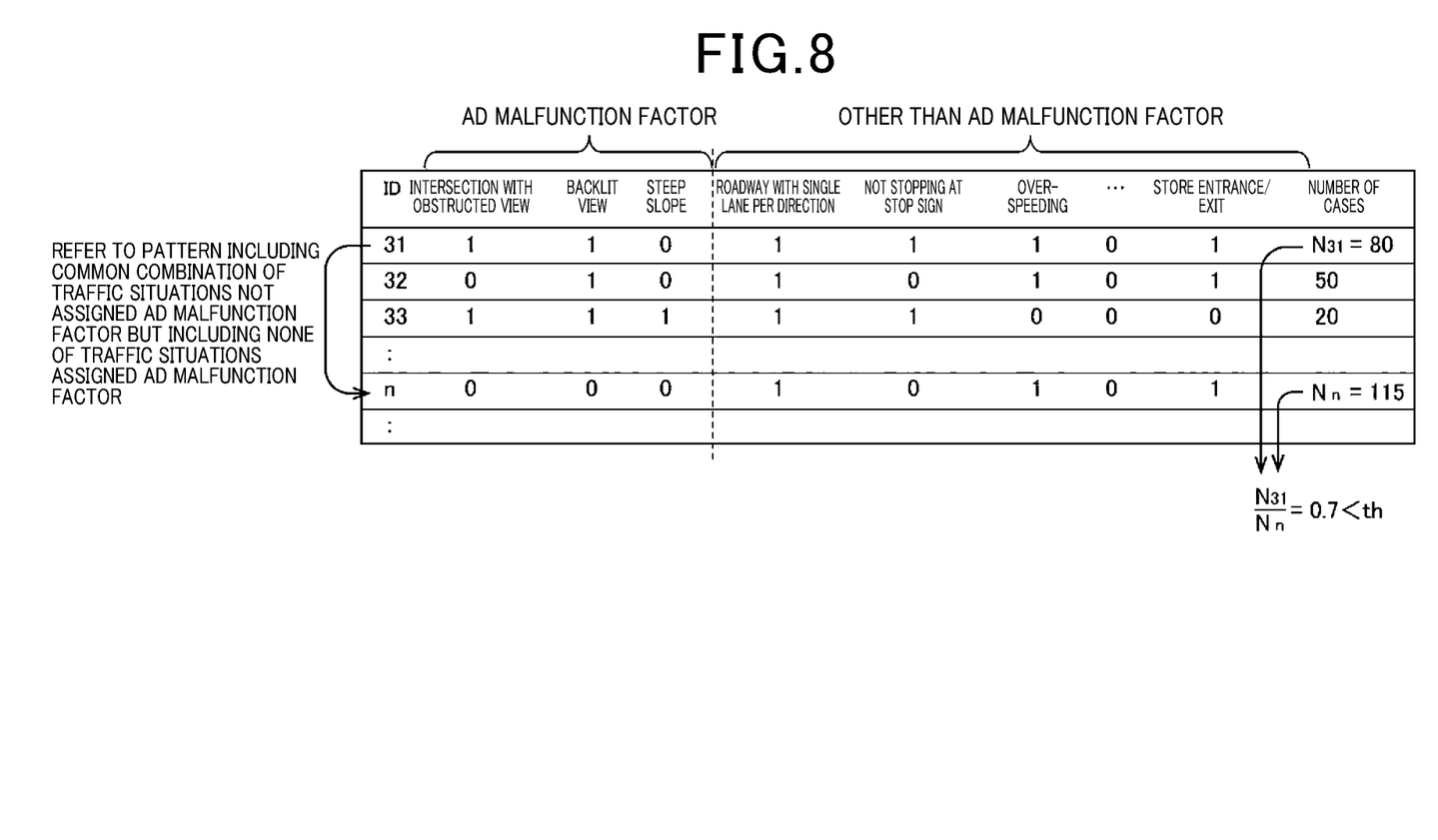
FIG. 8 is an illustration of determining an accident risk based on an AD malfunction factor.

In FIG. 8, N31 is 80, where N31 is the number of accident cases for the accident pattern of ID "31". The accident pattern of ID "n" is an accident pattern that shares a common combination of traffic situations other than the traffic situations assigned the attribute "AD malfunction factor" with the accident pattern of ID "31", but includes none of the traffic situations assigned the attribute "AD malfunction factor". A ratio of N31 to Nn, that is, N31/Nn, is calculated, where Nn is the number of accident cases for the accident pattern of ID "n". If the ratio of N31 to Nn (where N31/Nn=0.7) is equal to or less than the threshold th, it is not determined that the accident pattern of ID "31" is of high accident risk for the autonomous driving vehicles.

In addition, the accident risk simple determiner 105 determines that an accident pattern including only traffic situations assigned the attribute "AD malfunction factor" is of high accident risk for the autonomous driving vehicles.

If, for a certain accident pattern stored in the accident pattern database 103, the accident risk simple determiner 105 neither determines that the certain accident pattern is of high accident risk for the autonomous driving vehicles nor determines that the certain accident pattern is of low accident risk for the autonomous driving vehicles, the accident risk simple determiner 105 determines that the accident risk of the certain accident pattern should be determined by simulation.

The accident patterns determined to be of low accident risk for the autonomous driving vehicles are stored in the low-risk accident pattern database 106.

The accident patterns determined to be of high accident risk for the autonomous driving vehicles are stored in the high-risk accident pattern database 107.

The accident patterns, the accident risk of each of which is determined to be determined by simulation, are stored in the unknown-risk accident pattern database 108.

The simulation-based determiner 109 determines, for each of the accident patterns stored in the unknown-risk accident pattern database 108, whether the accident pattern is of high accident risk for the autonomous driving vehicles or of low accident risk for the autonomous driving vehicles.

For example, the simulation-based determiner 109 extracts, from the accident case database 101, an accident case having an accident pattern whose accident risk is determined to be determined by simulation, and simulates a travel situation on a simulator in a known manner from video, behavior information, location information and other information for the extracted accident case. A simulated autonomous driving vehicle is driven once or more times in the simulated travel situation. If a traffic accident occurs more than certain percentage of times, it is determined that the accident pattern whose accident risk is determined to be determined by simulation is of high accident risk for the autonomous driving vehicles and then this accident pattern is stored in the high-risk accident pattern database 107. If a traffic accident occurs less than certain percentage of times, it is determined that the accident pattern whose accident risk is determined to be determined by simulation is of low accident risk for the autonomous driving vehicle and then this accident pattern is stored in the low-risk accident pattern database 106.

Operations of Accident Pattern Determination Apparatus

Figure 9:
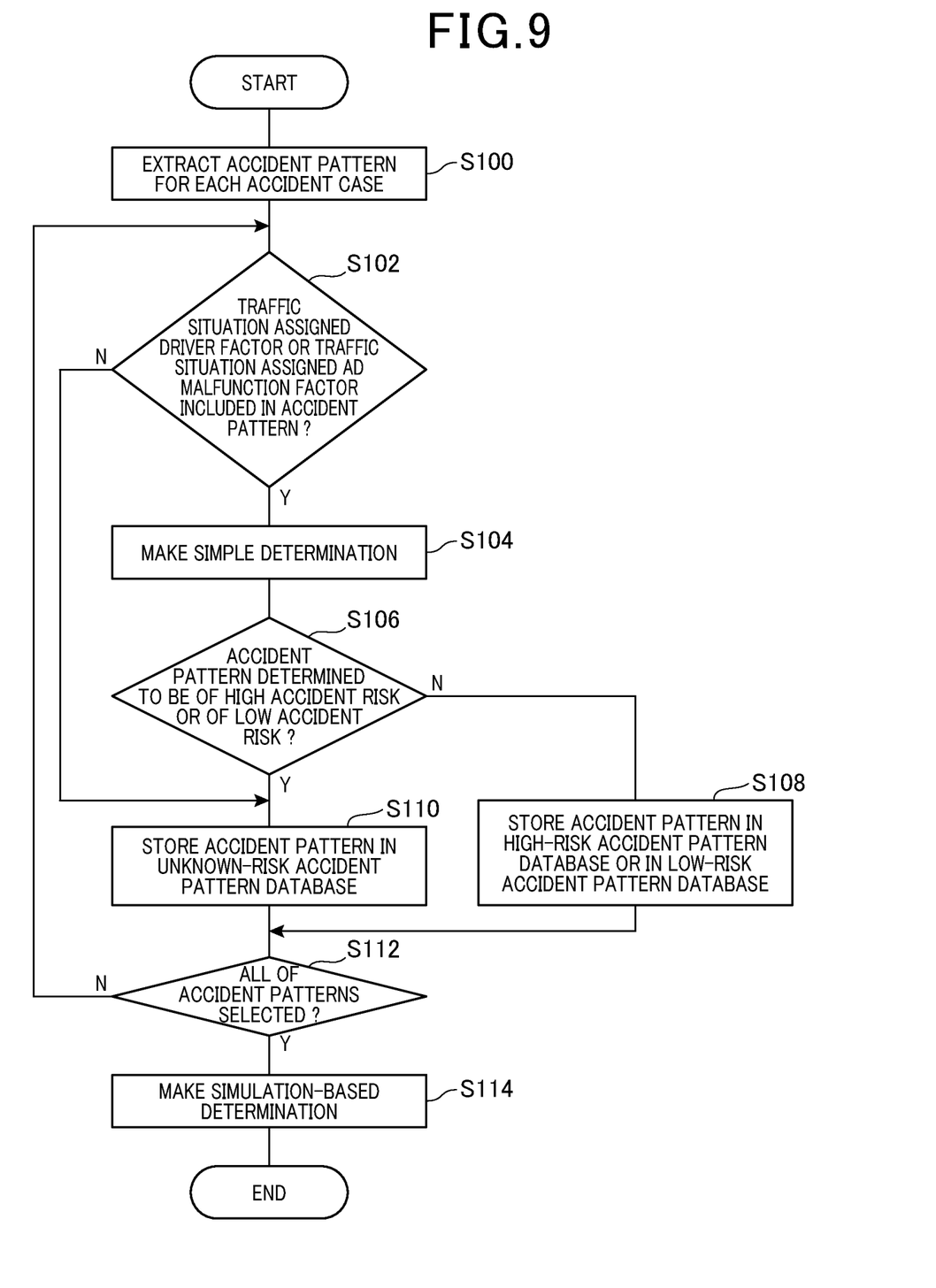
FIG. 9 is a flowchart of an accident pattern determination process.

FIG. 9 is a flowchart of an accident pattern determination process performed by the accident pattern determination apparatus 10. The CPU 11 loads the accident pattern determination program from the ROM 12 or the storage 14 into the RAM 13 to perform the accident pattern determination process.

At step S100, the CPU 11, as the accident pattern extractor 102, extracts, for each vehicle-related accident case, an accident pattern that is a combination of traffic situations from video, location information, behavior data, driver information, or traffic situation data for the accident case.

At step S102, the CPU 11 selects one of the accident patterns extracted at step S100 and determine whether the selected accident pattern includes at least one traffic situation assigned the attribute "driver factor" or at least one traffic situation assigned the attribute "AD malfunction factor." If the selected accident pattern includes at least one traffic situation assigned the attribute "driver factor" or at least one traffic situation assigned the attribute "AD malfunction factor", the CPU 11 proceeds to step S104. If the selected accident pattern does not include any traffic situations assigned the attribute "driver factor" or the attribute "AD malfunction factor", the CPU 11 proceeds to step S110.

At step S104, the CPU 11, as the accident risk simple determiner 105, makes a simple determination as to whether the selected accident pattern is an accident pattern of high accident risk for the autonomous driving vehicles or an accident pattern of low accident risk for the autonomous driving vehicles, based on the accident patterns for the respective accident cases stored in the accident pattern database 103 and the attributes assigned to respective ones of the plurality of traffic situations stored in the traffic situation attribute database 104.

At step S106, the CPU 11 determines whether the selected accident pattern was determined at step S104 to be an accident pattern of high accident risk for the autonomous driving vehicles or to be an accident pattern of low accident risk for the autonomous driving vehicles. If it is determined that the selected accident pattern was determined at step S104 to be an accident pattern of high accident risk for the autonomous driving vehicles or to be an accident pattern of low accident risk for the autonomous driving vehicles, the CPU 11 proceeds to step S108.

If it is determined that the selected accident pattern was determined at step S104 neither to be an accident pattern of high accident risk for the autonomous driving vehicles nor to be an accident pattern of low accident risk for the autonomous driving vehicles, the CPU 11 proceeds to step S110.

At step S108, the CPU 11 stores the selected accident pattern in the low-risk accident pattern database 106 if this selected accident pattern was determined at step S104 to be an accident pattern of low accident risk for the autonomous driving vehicles and stores the selected accident pattern in the high-risk accident pattern database 107 if this selected accident pattern was determined at step S104 to be an accident pattern of high accident risk for the autonomous driving vehicles.

At step S110, the CPU 11 stores the selected accident pattern in the unknown-risk accident pattern database 108.

At step S112, the CPU 11 determines whether all of the accident patterns extracted at step S100 have been selected and steps S102-S112 have been performed for all these accident patterns.

If there is an accident pattern for which steps S102-S112 have not been performed, the CPU 11 returns to step S102 and performs steps S102-S112 for this accident pattern. If all of the accident patterns extracted at step S100 have been selected and steps S102-S112 have been performed for all these accident patterns, the CPU 11 proceeds to step S114.

At step S114, the CPU 11, as the simulation-based determiner 109, determines, for each of the accident patterns stored in the unknown-risk accident pattern database 108, whether the accident pattern is an accident pattern of high accident risk for the autonomous driving vehicles or an accident pattern of low accident risk for the autonomous driving vehicles. In response to a result of determination, the CPU 11 stores the accident pattern in the high-risk accident pattern database 107 or in the low-risk accident pattern database 106. Thereafter, the accident pattern determination process ends.

As described above, based on the accident patterns for the respective accident cases, each accident pattern being a combination of traffic situations, and attributes of respective ones of the plurality of traffic situations, the accident pattern determination apparatus of the present embodiment determines, for each of the accident patterns extracted for respective accident cases, whether the accident pattern is an accident pattern of high accident risk for the autonomous driving vehicles or an accident pattern of low accident risk for the autonomous driving vehicles. This enables a simple process of determining accident risks for the autonomous driving vehicles. In addition, no simulations are needed for accident patterns that can be determined using a simple process, which can reduce simulation effort.

Modifications

In the embodiment set forth above, determine the accident risk for the autonomous driving vehicles using a simple process has been described. In an alternative embodiment, the present disclosure may be applied to any apparatus for determining the accident risk for specific vehicles other than the autonomous driving vehicles or in specific drivers.

More specifically, the accident risk for elderly drivers may be determined using a simple process, where the attributes assigned to traffic situations may further include an age-related factor. In the traffic situations assigned the attribute "age-related factor", a traffic accident is likely to occur as drivers age.

Figure 10:
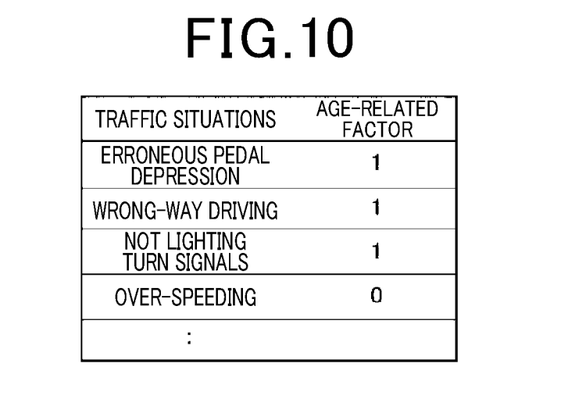
FIG. 10 is an example of a traffic situation attribute database.

For example, as illustrated in FIG. 10, the attribute "age-related factor" may be assigned to the traffic situations, such as "erroneous pedal depression", "wrong-way driving", "not lighting turn signals" and the like.

The accident risk simple determiner 105 acquires, for each accident pattern including at least one traffic situation assigned the attribute "age-related factor", the number of accident cases for the accident pattern. The accident risk simple determiner 105 acquires, for each accident pattern including at least one traffic situation assigned the attribute "age-related factor", the number of accident cases for an accident pattern that shares a common combination of traffic situations other than the traffic situations assigned the attribute "age-related factor" with the accident pattern including at least one traffic situation assigned the attribute "age-related factor", but includes none of the traffic situations assigned the attribute "age-related factor". The accident risk simple determiner 105 compares the number of accident cases for the accident pattern including at least one traffic situation assigned the attribute "age-related factor" and the number of accident cases for the accident pattern including the common combination of traffic situations other than the traffic situations assigned the attribute "age-related factor" but including none of the traffic situations assigned the attribute "age-related factor", thereby determining whether the accident pattern including at least one traffic situation assigned the attribute "age-related factor" is of high accident risk for the elderly drivers.

Figure 11:
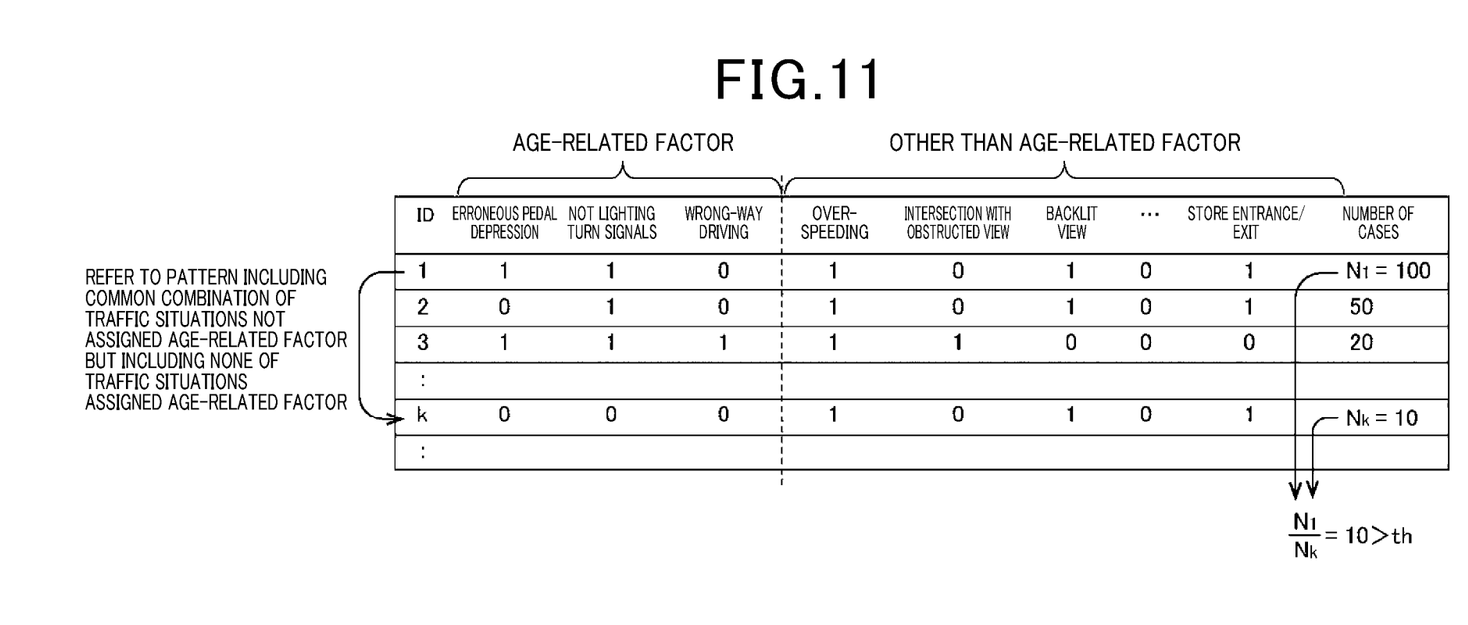
FIG. 11 is an illustration of determining an accident risk based on an age-related factor.

For example, as illustrated in FIG. 11, the number of accident cases for the accident pattern of ID "1", N1, is 100. The accident pattern of ID "k" is an accident pattern that shares a common combination of traffic situations other than the traffic situations assigned the attribute "age-related factor" with the accident pattern of ID "1", but includes none of the traffic situations assigned the attribute "age-related factor". A ratio of N1 to Nk (=N1/Nk) is calculated, where Nk is the number of accident cases for the accident pattern of ID "k". If the ratio of N1 to Nk (where N1/Nk=10) is greater than a threshold th, it is determined that the accident pattern of ID "1" is of high accident risk for elderly drivers. This is because it may be construed that an accident involved in at least one traffic situation assigned the attribute "age-related factor" is likely to occur to the elderly drivers.

The above processes executed by the CPU executing the software (computer programs) in each of the above-described embodiments may be executed by various processors other than the CPU. Examples of processors may include a programmable logic device (PLD) whose circuit configuration can be changed after the manufacture of a field-programmable gate array (FPGA) or the like, and a dedicated electric circuit which is a processor having a circuit configuration specifically designed for executing specific processing such as an application specific integrated circuit (ASIC) or the like. In addition, the above processes may also be executed by a single processor or by a combination of two or more processors of the same type or of different types (for example, a plurality of FPGAs and combinations of CPUs and FPGAs). Further, specifically, the electric circuit obtained by combining circuit elements, such as semiconductor elements, can be used as the hardware structure of these various processors.

In the above-described embodiments, the aspect in which the computer programs are pre-stored (pre-installed) in the ROM has been described, but the present disclosure is not limited thereto. The computer programs may be provided in a form recorded on a recording medium, such as a compact disk read only memory (CD-ROM), a digital versatile disk read only memory (DVD-ROM), or a universal serial bus (USB) memory, and then provided. In addition, the computer programs may be downloaded from an external device via a network.

What is claimed is:

1. An accident pattern determination apparatus comprising:
   a storage storing attributes assigned to a plurality of predefined traffic situations;
   an acquirer configured to acquire, for each of vehicle-related accident cases, an accident pattern that is a combination of traffic situations in a respective accident case, from the plurality of predefined traffic situations; and
   a determiner configured to determine, for each accident pattern acquired by the acquirer, whether the accident pattern is an accident pattern of high accident risk or an accident pattern of low accident risk for specific vehicles or drivers, based on the accident patterns acquired for the respective accident cases and the attributes assigned to the plurality of predefined traffic situations, wherein
   the specific vehicles are autonomous driving vehicles,
   the attributes include a first attribute assigned to traffic situations in which autonomous driving will malfunction, and a second attribute assigned to traffic situations that are likely to affect driver's driving, and
   the determiner is configured to compare, for each accident pattern including at least one traffic situation assigned the second attribute, a number of accident cases for the accident pattern including the at least one traffic situation assigned the second attribute and a number of accident cases for an accident pattern that shares a common combination of traffic situations not assigned the second attribute with the accident pattern including the at least one traffic situation assigned the second attribute, and thereby determine whether the accident pattern including the at least one traffic situation assigned the second attribute is of high accident risk for the autonomous driving vehicles.

2. The accident pattern determination apparatus according to claim 1, wherein
the determiner is configured to determine, for each accident pattern acquired for each accident case by the acquirer, whether the accident pattern is an accident pattern of high accident risk or an accident pattern of low accident risk, and in response to neither determining that the accident pattern is an accident pattern of high accident risk nor determining that the accident pattern is an accident pattern of low accident risk, determine that an accident risk of the accident pattern is to be determined by simulation.

3. The accident pattern determination apparatus according to claim 1, wherein
the specific drivers are elderly drivers.

4. An accident pattern determination apparatus comprising:
a storage storing attributes assigned to a plurality of predefined traffic situations;
an acquirer configured to acquire, for each of vehicle-related accident cases, an accident pattern that is a combination of traffic situations in a respective accident case, from the plurality of predefined traffic situations; and
a determiner configured to determine, for each accident pattern acquired by the acquirer, whether the accident pattern is an accident pattern of high accident risk or an accident pattern of low accident risk for specific vehicles or drivers, based on the accident patterns acquired for the respective accident cases and the attributes assigned to the plurality of predefined traffic situations, wherein
the specific vehicles are autonomous driving vehicles,
the attributes include a first attribute assigned to traffic situations in which autonomous driving will malfunction, and a second attribute assigned to traffic situations that are likely to affect driver's driving, and
the determiner is configured to compare, for each accident pattern including at least one traffic situation assigned the first attribute, a number of accident cases for the accident pattern including the at least one traffic situation assigned the first attribute and a number of accident cases for an accident pattern that shares a common combination of traffic situations not assigned the first attribute with the accident pattern including the at least one traffic situation assigned the first attribute, and thereby determine whether the accident pattern including the at least one traffic situation assigned the first attribute is of high accident risk for the autonomous driving vehicles.

5. The accident pattern determination apparatus according to claim 4, wherein the determiner is configured to determine, for each accident pattern acquired for each accident case by the acquirer, whether the accident pattern is an accident pattern of high accident risk or an accident pattern of low accident risk, and
in response to neither determining that the accident pattern is an accident pattern of high accident risk nor determining that the accident pattern is an accident pattern of low accident risk, determine that an accident risk of the accident pattern is to be determined by simulation.

6. An accident pattern determination method implemented by a computer equipped with a storage storing attributes assigned to respective ones of a plurality of predefined traffic situations, the accident pattern determination method comprising;
acquiring, for each of vehicle-related accident cases, an accident pattern that is a combination of traffic situations in a respective accident case, from the plurality of predefined traffic situations; and
determining, for each accident pattern acquired, whether the accident pattern is an accident pattern of high accident risk or an accident pattern of low accident risk for specific vehicles or drivers, based on the accident patterns acquired for the respective accident cases and the attributes assigned to respective ones of the plurality of predefined traffic situations, wherein
the specific vehicles are autonomous driving vehicles,
the attributes include a first attribute assigned to traffic situations in which autonomous driving will malfunction, and a second attribute assigned to traffic situations that are likely to affect driver's driving, and
the determining includes comparing, for each accident pattern including at least one traffic situation assigned the second attribute, a number of accident cases for the accident pattern including the at least one traffic situation assigned the second attribute and a number of accident cases for an accident pattern that shares a common combination of traffic situations not assigned the second attribute with the accident pattern including the at least one traffic situation assigned the second attribute, and thereby determine whether the accident pattern including the at least one traffic situation assigned the second attribute is of high accident risk for the autonomous driving vehicles.

7. A non-transitory computer-readable storage medium having stored therein instructions executable by a processor, the processor being accessible to a storage storing attributes assigned to respective ones of a plurality of predefined traffic situations, to cause the processor to perform functions comprising:
acquiring, for each of vehicle-related accident cases, an accident pattern that is a combination of traffic situations in a respective accident case, from the plurality of predefined traffic situations; and
determining, for each accident pattern acquired, whether the accident pattern is an accident pattern of high accident risk or an accident pattern of low accident risk for specific vehicles, based on the accident patterns acquired for the respective accident cases and the attributes assigned to respective ones of the plurality of predefined traffic situations, wherein
the specific vehicles are autonomous driving vehicles, and
the attributes include a first attribute assigned to traffic situations in which autonomous driving will malfunction, and a second attribute assigned to traffic situations that are likely to affect driver's driving,
the determining includes comparing, for each accident pattern including at least one traffic situation assigned the second attribute, a number of accident cases for the accident pattern including the at least one traffic situation assigned the second attribute and a number of accident cases for an accident pattern that shares a common combination of traffic situations not assigned the second attribute with the accident pattern including the at least one traffic situation assigned the second attribute, and thereby determine whether the accident pattern including the at least one traffic situation assigned the second attribute is of high accident risk for the autonomous driving vehicles.

8. An accident pattern determination method implemented by a computer equipped with a storage storing attributes assigned to respective ones of a plurality of predefined traffic situations, the accident pattern determination method comprising;
acquiring, for each of vehicle-related accident cases, an accident pattern that is a combination of traffic situations in a respective accident case, from the plurality of predefined traffic situations; and
determining, for each accident pattern acquired, whether the accident pattern is an accident pattern of high accident risk or an accident pattern of low accident risk for specific vehicles or drivers, based on the accident patterns acquired for the respective accident cases and the attributes assigned to respective ones of the plurality of predefined traffic situations
the specific vehicles are autonomous driving vehicles, and
the attributes include a first attribute assigned to traffic situations in which autonomous driving will malfunction, and a second attribute assigned to traffic situations that are likely to affect driver's driving,
the determining includes comparing, for each accident pattern including at least one traffic situation assigned the first attribute, a number of accident cases for the accident pattern including the at least one traffic situation assigned the first attribute and a number of accident cases for an accident pattern that shares a common combination of traffic situations not assigned the first attribute with the accident pattern including the at least one traffic situation assigned the first attribute, and thereby determine whether the accident pattern including the at least one traffic situation assigned the first attribute is of high accident risk for the autonomous driving vehicles.

9. A non-transitory computer-readable storage medium having stored therein instructions executable by a processor, the processor being accessible to a storage storing attributes assigned to respective ones of a plurality of predefined traffic situations, to cause the processor to perform functions comprising:
acquiring, for each of vehicle-related accident cases, an accident pattern that is a combination of traffic situations in a respective accident case, from the plurality of predefined traffic situations; and
determining, for each accident pattern acquired, whether the accident pattern is an accident pattern of high accident risk or an accident pattern of low accident risk for specific vehicles, based on the accident patterns acquired for the respective accident cases and the attributes assigned to respective ones of the plurality of predefined traffic situations, wherein
the specific vehicles are autonomous driving vehicles, and
the attributes include a first attribute assigned to traffic situations in which autonomous driving will malfunction, and a second attribute assigned to traffic situations that are likely to affect driver's driving,
the determining includes comparing, for each accident pattern including at least one traffic situation assigned the first attribute, a number of accident cases for the accident pattern including the at least one traffic situation assigned the first attribute and a number of accident cases for an accident pattern that shares a common combination of traffic situations not assigned the first attribute with the accident pattern including the at least one traffic situation assigned the first attribute, and thereby determine whether the accident pattern including the at least one traffic situation assigned the first attribute is of high accident risk for the autonomous driving vehicles.

* * * * *